United States Patent
Juneja (10) Patent No.: US 10,116,457 B1
(45) Date of Patent: Oct. 30, 2018

(54) METHODS, SYSTEMS, AND COMPUTER READABLE MEDIA FOR USAGE MONITORING

(71) Applicant: Oracle International Corporation, Redwood Shores, CA (US)

(72) Inventor: Rohit Juneja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/648,398

(22) Filed: Jul. 12, 2017

(51) Int. Cl.
*H04W 24/10* (2009.01)
*H04L 12/14* (2006.01)
*H04W 4/24* (2018.01)

(52) U.S. Cl.
CPC ........... *H04L 12/1407* (2013.01); *H04W 4/24* (2013.01); *H04W 24/10* (2013.01)

(58) Field of Classification Search
CPC ...... H04L 12/1407; H04W 24/10; H04W 4/24
See application file for complete search history.

(56) References Cited

U.S. PATENT DOCUMENTS

| | | | |
|---|---|---|---|
| 8,606,222 B2 | 12/2013 | Agarwal et al. |
| 8,620,263 B2 | 12/2013 | Ravishankar et al. |
| 8,718,075 B2 | 5/2014 | Cai et al. |
| 8,825,003 B2 | 9/2014 | Ravishankar et al. |
| 8,989,056 B2 | 3/2015 | Baniel et al. |
| 9,065,660 B2 | 6/2015 | Ellis et al. |
| 9,185,237 B2 | 11/2015 | McMurry et al. |
| 9,374,764 B2 | 6/2016 | Batz et al. |
| 9,444,692 B2 | 9/2016 | Lehane et al. |
| 9,544,751 B2 | 1/2017 | McNamee et al. |
| 2013/0085909 A1 | 4/2013 | Mo et al. |
| 2014/0233432 A1* | 8/2014 | Lim .................. H04L 63/20 370/259 |
| 2014/0321271 A1 | 10/2014 | Bonnier et al. |
| 2015/0201371 A1* | 7/2015 | Tamura ............. H04W 48/16 370/259 |

FOREIGN PATENT DOCUMENTS

EP  2 466 787 A1  6/2012

OTHER PUBLICATIONS

"Universal Mobile Telecommunications System (UMTS); LTE; Policy and Charging Control (PCC); Reference points (3GPP TS 29.212 version 13.5.0 Release 13)," ETSI TS 129 212 V13.5.0, pp. 1-258 (Apr. 2016).

Castro et al., "SAPC: Ericsson's convergent policy controller," http://www.ericsson.com/res/thecompany/docs/publications/ericsson_review/2010/sapc.pdf, Ericsson Review, pp. 1-6 (Jan. 2010).

"Policy Use Case—Usage Monitoring and Reporting," https://www.developingsolutions.com/use-cases/policy-use-case-usage-monitoring-and-reporting/, Developing Solutions, Inc., pp. 1-4 (Copyright 2009).

* cited by examiner

*Primary Examiner* — Chong A Ngo
(74) *Attorney, Agent, or Firm* — Jenkins, Wilson, Taylor & Hunt, P.A.

(57) ABSTRACT

Methods, systems, and computer readable media for usage monitoring are disclosed. In some examples, a method occurs at a policy enforcement node for enforcing policies in a mobile network. The method may include installing a rule for reporting user equipment (UE) related usage information based on at least one threshold value indicating an interval for sending usage reports. The method may also include in response to UE related usage meeting or exceeding the at least one threshold value, sending a first usage monitoring report message to a policy rules node.

18 Claims, 4 Drawing Sheets

METHODS, SYSTEMS, AND COMPUTER READABLE MEDIA FOR USAGE MONITORING

TECHNICAL FIELD

The subject matter described herein relates generally to filter installation on user equipment in mobile networks. More particularly, the subject matter described herein relates to methods, systems, and computer readable media for usage monitoring.

BACKGROUND

A $3^{rd}$ Generation Partnership Project (3GPP) mobile network, such as a long term evolution (LTE) network, typically includes a core network, a transport network, and one or more radio access networks. The core network for the mobile network establishes bearers (logical connections) among service nodes on a path between a wireless device, attached to one of the radio access networks, and a packet network, e.g., the Internet. The service nodes then use the bearers to transport subscriber traffic between the wireless device and the packet network.

The core network can include a policy and charging rules function (PCRF) that sends usage monitoring rules to a policy and charging enforcement function (PCEF). The PCEF may then enforce the usage monitoring rules. However, existing usage monitoring functionality in policy nodes is somewhat coarse and can cause resource inefficiencies and/or increased messaging overhead. For example, when determining whether a user is about to reach their usage consumption quota, a PCRF may be required to query the PCEF multiple times to detect that usage is at an appropriate level before performing one or more actions, e.g., notifying a user and inquiring about recharging or re-upping the user's data consumption quota.

Accordingly, in light of these difficulties, there exists a need for methods, systems, and computer readable media for usage monitoring.

SUMMARY

The subject matter described in this specification relates to methods, systems, and computer readable media for usage monitoring. In some examples, a method occurs at a policy enforcement node for enforcing policies in mobile network. The method may include installing a rule for reporting user equipment (UE) related usage information based on at least one threshold value indicating an interval for sending usage reports. The method may include, in response to UE related usage meeting or exceeding the at least one threshold value, sending a first usage monitoring report message to a policy rules node.

According to another aspect of the subject matter described in this specification, a system for usage monitoring is provided. The system includes at least one processor and a policy enforcement node for enforcing policies in mobile network. The policy enforcement node is implemented using the at least one processor and is configured to perform operations comprising: installing a rule for reporting user equipment (UE) related usage information based on at least one threshold value indicating an interval for sending usage reports; and in response to UE related usage meeting or exceeding the at least one threshold value, sending a first usage monitoring report message to a policy rules node.

The subject matter described in this specification may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
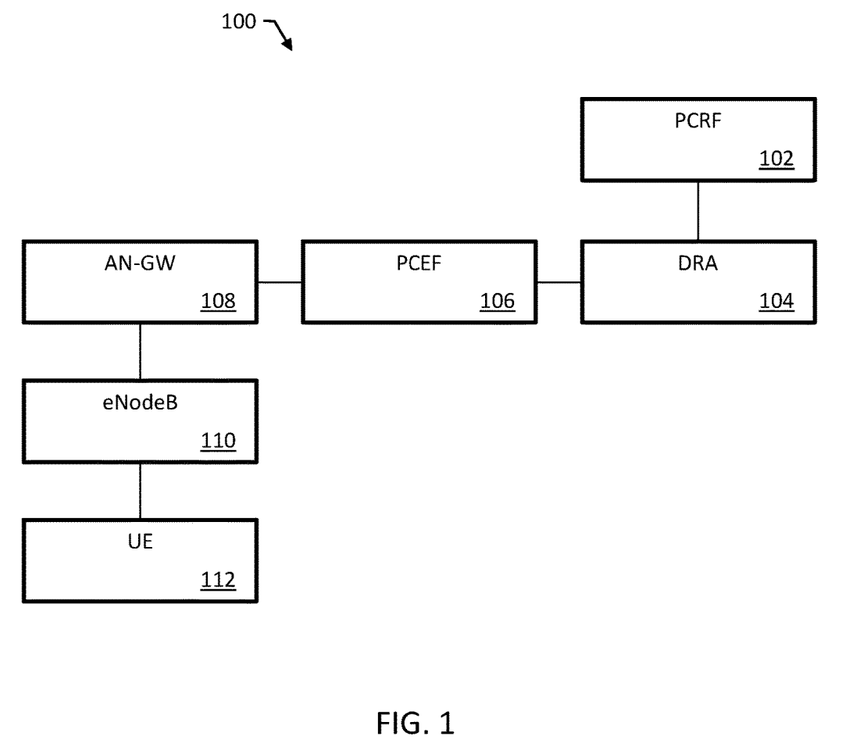
FIG. 1 is a block diagram of a portion of an example core network for a mobile network.

FIG. 1 is a block diagram of a portion of an example core network 100 for a mobile network. The mobile network can be, e.g., a long term evolution (LTE) cellular telecommunications network. Network 100 includes a policy and charging rules function (PCRF) 102, a diameter routing agent (DRA) 104, a policy and charging enforcement function (PCEF) 106, and access network gateway (AN-GW) 108. User equipment (UE) 112 connects to network 100 using an evolved node B (eNodeB) 110 for a radio access network.

PCRF 102 may include one or more processors that perform the operations described in this specification for generating, sending, and/or installing usage monitoring rules on PCEF 106. For example, PCRF 102 may be implemented on a computing platform includes one or more processor blades, each implementing a PCRF or other function. PCRF 102 may be implemented in a distributed computing system or any appropriate system of one or more computers. PCRF 102 is part of a 3GPP policy charging control (PCC) architecture. The elements of the PCC provide access, resource, and quality-of-service (QoS) control.

In operation, PCRF 102 functions in real-time or near real-time to determine policy rules in the mobile network. PCRF 102 can operate at the network core and access user information and other specialized functions in a centralized manner. PCRF 102 can aggregate information to and from the mobile network, operational supports systems, and other sources in real-time or near real-time, which can be useful for the creation of rules and automatically making policy decisions for each user active on the mobile network. Using PCRF 102, the mobile network can offer multiple services, QoS levels, and charging rules.

In some examples, PCRF 102 provides the ability to manage both network and user policy in real-time or near real-time. PCRF 102 can efficiently and dynamically route and prioritize network traffic. PCRF 102 can provide a unified view of user context based on one or more of device, network, location, and billing data. PCRF 102 can provide key inputs to revenue assurance and bandwidth management.

PCRF 102 can communicate with other systems in network 100 using Diameter. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message. DRA 104 is configured to route Diameter messages in network 100.

PCEF 106 is configured to enforce any policy and charging control (PCC) decisions made by PCRF 102 and handle service data flows (e.g., forwarding or dropping packets related to a requested service). PCRF 102 communicates with PCEF 106, e.g., via a Gx interface. The Gx interface can be used to install, modify, and remove policy and charging commands and rules between PCRF 102 and PCEF 106 in either pull or push modes.

PCEF 106 may be configured for traffic detection and resultant policy enforcement. PCEF 106 provides information to PCRF 102 about UE 112 and any requested services. For example, PCEF 106 may provide a subscriber identifier (ID), an internet protocol (IP) address of UE 112, and an identifier of a network that provides the requested service.

PCEF 106 is implemented on a computer system comprising one or more processors. For example, PCEF 106 may be implemented in a server such as a packet gateway (PGW) or a computer system integrated with the PGW. The PGW can provide connectivity from UE 112 to external packet data networks by being the point of exit and entry of traffic for or/and from UE 112. PCEF 106, in combination with the PGW, can perform policy enforcement, packet filtering, charging support, packet screening, and the like.

AN-GW 108 is configured for the delivery of data packets to and from a number of mobile stations, e.g., mobile stations within a geographic service area. AN-GW 108 performs tasks including packet routing and transfer, mobility management (attach/detach and location management), logical link management, and authentication and charging functions. The location register of the AN-GW 108 can store location information (e.g., current cell, current VLR) and user profiles (e.g., IMSI, addresses) of GPRS users registered with AN-GW 108.

eNodeB 110 is an element of an LTE radio access network. eNodeB 110 can include the communications hardware that communicates directly with UE 112. eNodeB 110 is configured for operation without a separate controller element, which can simplify the network architecture and allow lower response times. eNodeB 110 can use the S1-AP protocol on the S1-MME interface with a mobility management entity (MME) for control plane traffic, and eNodeB 110 can use the GTP-U protocol on the S1-U interface for user plane traffic.

UE 112 can be any appropriate user computer system. UE 112 typically includes at least one processor, memory, wireless communications hardware, a display, and at least one user input device. UE 112 can be, for example, a wireless mobile device such as a phone, tablet, or laptop.

PCRF 102 can be configured to install various usage monitoring rules for monitoring UE and/or session-based usage (e.g., volume or time of user plane traffic). In some examples, PCRF 102 may be configured to perform various functions, including some functions similar to those described in 3GPP TS 29.212 v13.5.0; the disclosure of which is hereby incorporated in its entirety. For example, PCRF 102 may send, via a Gx interface or another communications interface, usage monitoring instructions to PCEF 106 for usage monitoring. In this example, PCEF 106 may enforce or perform usage monitoring as instructed by PCRF 102 and may provide one or more usage reports to PCRF 102.

PCRF 102 can send usage monitoring rules or related instructions using any appropriate message and attribute-value pairs (AVPs) within the message. For example, PCRF 102 can send an Event-Trigger AVP set to value of "USAGE_REPORT" in a credit-control-answer (CCA) message or a re-auth-request (RAR) message. In this example, PCRF 102 may not remove the "USAGE_REPORT" Event-Trigger AVP while usage monitoring is active in PCEF 106.

PCRF 102 can also provide usage thresholds and/or other information related to usage monitoring via various messages and/or AVPs. For example, PCRF 102 can send a Usage-Monitoring-Information AVP. The Usage-Monitoring-Information AVP is of type grouped (e.g., an AVP that includes one or more AVPs). The Usage-Monitoring-Information AVP may be sent from PCRF 102 to PCEF 106 and can contain various thresholds and/or usage monitoring control information as set forth below:

Usage-Monitoring-Information::=<AVP Header: 1067 >
[Monitoring-Key]
0*2 [Granted-Service-Unit]
0*2 [Used-Service-Unit]
[Quota-Consumption-Time]
[Usage-Monitoring-Level]
[Usage-Monitoring-Report]
[Usage-Monitoring-Support]
*[AVP]

The Monitoring-Key AVP is of type is OctetString and can be used for usage monitoring control purposes as an identifier to a usage monitoring control instance. For example, the Monitoring-Key AVP may be sent from PCRF 102 to PCEF 106 and may indicate one or more service data flows or all the traffic in an IP-CAN session.

The Granted-Service-Unit AVP is of type grouped and can be used to provide the volume and/or the time of usage threshold level to PCEF 106. The Granted-Service-Unit AVP includes a threshold level, e.g., a total volume, an uplink volume, a downlink volume, an uplink and downlink volume, or a time. PCRF 102 may include the applicable volume threshold(s) in the CC-Total-Octets, CC-Input-Octets or CC-Output-Octets AVPs and/or time threshold in the CC-Time AVP of the Granted-Service-Unit AVP.

The Used-Service-Unit AVP is of type grouped and can be used by PCEF 106 to provide the measured usage to PCRF 102. The Used-Service-Unit AVP can include a value (e.g., a usage measurement) or other information for reporting usage information requested by PCRF 102, e.g., a total volume, an uplink volume, a downlink volume, an uplink and downlink volume, or a time. PCEF 106 may include the applicable usage volume values or measurements in the CC-Total-Octets, CC-Input-Octets or CC-Output-Octets AVPs and/or time values or measurements in the CC-Time AVP of the Granted-Service-Unit AVP.

The Quota-Consumption-Time AVP can be used by PCRF 102 to indicate the time interval in seconds after which time measurement is to stop for a particular monitoring key if no traffic is received belonging to the corresponding monitoring key. For example, the Quota-Consumption-Time AVP may be included when the Usage-Monitoring-Information AVP also contains a Granted-Service-Unit AVP that includes a CC-Time AVP indicating a time based threshold. In this example, if the Quota-Consumption-Time AVP contains a value of '0', or if the Quota-Consumption-Time AVP is not present, the time of usage may be measured continuously from the point user plane traffic is detected for a corresponding monitoring key until the time usage measurement is disabled for the same monitoring key.

The Usage-Monitoring-Level AVP is of type Enumerated and can be used by PCRF 102 to indicate whether the usage monitoring instance applies to an IP-CAN session or to one or more PCC rules or to one or more application detection and control (ADC) rules. For example, the Usage-Monitoring-Level AVP may include a value of '0' for SESSION_LEVEL, a value of '1' for PCC_RULE_LEVEL, or a value of '2' for ADC_RULE_LEVEL.

The Usage-Monitoring-Report AVP is of type Enumerated and can be used by PCRF 102 to indicate that accumulated usage is to be reported by PCEF 106 regardless of whether a usage threshold is reached for a certain usage monitoring key. For example, the Usage-Monitoring-Report AVP may include a value of '0' for USAGE_MONITORING_REPORT_REQUIRED.

The Usage-Monitoring-Support AVP is of type Enumerated and can be used by PCRF 102 to indicate whether usage monitoring shall be disabled for a certain monitoring key. For example, the Usage-Monitoring-Support AVP may include a value of '0' for USAGE_MONITORING_DISABLED.

In some examples, using functionality described in 3GPP TS 29.212 v13.5.0, PCRF 102 may send a usage monitoring rule or a related message that includes usage monitoring Information in Granted-Service-Unit AVP along with an Event-Trigger AVP to PCEF 106. When a threshold is breached, a notification is sent to PCRF 102 with one or more Used-Service-Unit AVPs containing usage monitoring information, e.g., data volume or time measurements. After sending the notification, the usage monitoring rule is removed or disabled by PCEF 106.

In some examples, using functionality described in 3GPP TS 29.212 v13.5.0, PCRF 102 can query PCEF 106 to retrieve usage information. In such examples, in response, PCEF 106 may report all usage and reset triggers (e.g., a usage monitoring rule may be disabled), thereby requiring PCRF 102 to rearm triggers/thresholds by sending one or more additional messages.

While the functionality described in 3GPP TS 29.212 v13.5.0 is adequate for some scenarios, other scenarios can present issues, e.g., resource inefficiencies and/or additional messages, when using the functionality described in 3GPP TS 29.212 v13.5.0. For example, if PCRF 102 wants timely notification of usage from PCEF 106, then PCRF 102 has to query PCEF 106 with an RAR message which can lead to additional messaging of no value if user has not consumed any data or has not reached a value of interest of PCRF. In this example, a usage consumption quota may be manually configured on PCRF 102 and allocated in chunks and actions may be taken based on such static configured values. Another example involves a mid-page redirection where a vendor displays a notification or mid-page informing a user that a certain amount data has been consumed and asking the user if they would like to recharge (e.g., increase their usage limits) or continue without recharging. In this example, PCRF 102 may send only a portion of usage consumption quota and when that quota is breached, PCRF 102 may perform a mid-page redirection and rearm again with the remaining portion of quota. It should be apparent that in such a scenario PCRF 102 may be required to send multiple queries for usage consumption or allocate quota in chunks. Hence, the functionality described in 3GPP TS 29.212 v13.5.0 typically requires additional messaging to handle the scenarios discussed above.

In some examples, PCRF 102 and PCEF 106 may be configured to utilize additional and/or different functionality than the functionality described in 3GPP TS 29.212 v13.5.0. For example, PCRF 102 may provide additional and/or different usage monitoring control information and may use different, new, and/or modified AVPs and/or messages from those described in 3GPP TS 29.212 v13.5.0 to perform usage monitoring or related aspects.

In some examples, PCRF 102 and/or other policy related nodes may be configured to provide instructions for requesting interval based usage reporting from PCEF 106 or another policy enforcement node. For example, PCRF 102 may use various messages and/or AVPs to indicate that usage reports for a given monitoring key be sent after every 1 gigabyte is consumed/used or after every 5% of a total usage consumption quota is consumed/used. In another example, PCRF 102 may use various messages and/or AVPs to indicate that usage reports for a given monitoring key be sent after every 5 minutes of time is consumed/used or after every 5% of a total time allotted or granted is consumed/used.

In some examples, PCRF 102 can use a modified Usage-Monitoring-Information AVP containing additional AVPs than those described in 3GPP TS 29.212 v13.5.0. An example modified Usage-Monitoring-Information AVP is set forth below Usage-Monitoring-Information::=<AVP Header: 1067 >
[Monitoring-Key]
0*2 [Granted-Service-Unit]
0*2 [Used-Service-Unit]
0*2 [Absolute-Granted-Service-Unit-Request]
0*2 [Absolute-Used-Service-Unit-Report]
0*2 [Percent-Granted-Service-Unit-Request]
0*2 [Percent-Used-Service-Unit-Report]
[Quota-Consumption-Time]
[Usage-Monitoring-Level]
[Usage-Monitoring-Report]
[Usage-Monitoring-Support]
*[AVP]

In the example modified Usage-Monitoring-Information AVP shown above, new AVPs (e.g., AVPs not found 3GPP TS 29.212 v13.5.0) are bolded. For example, new AVPs may include an Absolute-Granted-Service-Unit-Request AVP, an Absolute-Used-Service-Unit-Report AVP, a Percent-Granted-Service-Unit-Request AVP, and a Percent-Used-Service-Unit-Report AVP. In this example, these AVPs may be usable for interval based usage monitoring support for granted units.

The Absolute-Granted-Service-Unit-Request AVP can be used by PCRF 102 to request reports at threshold or interval value(s) from PCEF 106. The Absolute-Granted-Service-Unit-Request AVP may include applicable threshold values(s) in the CC-Total-Octets, CC-Input-Octets or CC-Output-Octets AVPs of the Granted-Service-Unit AVP.

The Absolute-Used-Service-Unit AVP can be used by PCEF 106 to provide reports of usage that meet or exceed the threshold or interval value(s) indicated in the Absolute-Granted-Service-Unit-Request AVP to PCRF 102. The Used-Service-Unit AVP may include the applicable usage value(s) in the CC-Total-Octets, CC-Input-Octets or CC-Output-Octets AVPs.

For example, a usage monitoring rule may be associated with a Granted-Service-Unit AVP indicating a 5 gigabyte usage consumption quota for a subscriber and an Absolute-Granted-Service-Unit-Request AVP indicating a 1 gigabyte threshold or interval value. In this example, after installing the usage monitoring rule at PCEF 106, PCEF 106 may notify PCRF 102 every time 1 gigabyte of data is consumed using a Absolute-Used-Service-Unit AVP containing a CC-Total-Octets AVP indicating the total amount of data consumed for the subscriber.

In some examples, PCRF 102 may send an Absolute-Granted-Service-Unit-Request AVP to PCEF 106 to request timely reporting of requested threshold values without impacting existing triggers and or reporting mechanisms. In such examples, rearming or resending of triggers may not be required for interval based reporting described herein and PCEF 106 may continue to report usage with an Absolute-Used-Service-Unit-Report AVP whenever configured absolute figures are breached (e.g., met or exceeded) at PCEF 106. Further, in some examples, breaching threshold values set in an Absolute-Granted-Service-Unit-Request AVP may not reset any triggers but can be used as a notification mechanism to inform PCRF 102 regarding usage consumption progress so that PCRF 102 can take appropriate action(s) if needed.

The Percent-Granted-Service-Unit-Request AVP can be used by PCRF 102 to request reports at percentage based threshold or interval value(s) from PCEF 106. The Percent-Granted-Service-Unit-Request AVP may include applicable threshold value(s) (e.g., values from 0-100) in the CC-Total-Octets, CC-Input-Octets or CC-Output-Octets AVPs of the Granted-Service-Unit AVP.

The Percent-Used-Service-Unit AVP can be used by PCEF 106 to provide reports of usage that meet or exceed the threshold or interval value(s) indicated in the Percent-Granted-Service-Unit-Request AVP to PCRF 102. The Used-Service-Unit AVP may include the applicable usage values(s) or measurement(s) in the CC-Total-Octets, CC-Input-Octets or CC-Output-Octets AVPs.

For example, a usage monitoring rule may be associated with a Granted-Service-Unit AVP indicating a 5 gigabyte usage consumption quota for a subscriber and a Percent-Granted-Service-Unit-Request AVP indicating a 25% threshold or interval value. In this example, after installing the usage monitoring rule at PCEF 106, PCEF 106 may notify PCRF 102 every time 1.25 gigabytes are consumed (e.g., 25% of the 5 gigabyte quota) using a Percent-Used-Service-Unit AVP containing a CC-Total-Octets AVP indicating the total percentage based amount of data consumed for the subscriber.

In some examples, PCRF 102 may send a Percent-Granted-Service-Unit-Request AVP to PCEF 106 to request timely reporting of requested threshold values without impacting existing triggers and or reporting mechanisms. In such examples, rearming or resending of triggers may not be required for interval based reporting described herein and PCEF 106 may continue to report usage with a Percent-Used-Service-Unit-Report AVP whenever configured percentage based values are breached (e.g., met or exceeded) at PCEF 106. Further, in some examples, breaching threshold values set in a Percent-Granted-Service-Unit-Request AVP may not reset any triggers but can be used as a notification mechanism to inform PCRF 102 regarding usage consumption progress so that PCRF 102 can take appropriate action(s) if needed.

In some examples, PCRF 102, PCEF 106, and/or other policy related nodes may be configured to apply information of Usage-Monitoring-Level and Usage-Monitoring-Support AVPs with regard to the new AVPs described herein.

In some examples, PCRF 102, PCEF 106, and/or other policy related nodes may be configured to allow various thresholds provided via one or more new AVPs to be overwritten/removed at any point of time.

In some examples, modifications to PCRF 102 and PCEF 106 and/or other policy related nodes, relevant communications protocols, and/or related functionality can provide more efficient usage monitoring and other advantages over existing functionality. For example, aspects described in the present specification provide mechanisms and/or techniques for efficient monitoring of usage based on interval reporting and/or gradual usage. Further, using aspects described in the present specification, PCRF 102 can trigger actions based on timely update and can trigger a new set of reporting functionality without additional querying or rearming related messaging.

In some examples, the new AVPs or similar AVPs may be usable for interval based usage monitoring related to time usage values. For example, similar support can be provided for time based monitoring by introducing AVPs to request and report Time usage values based on fixed values or percentage based values for reporting at regular intervals consistent with volume based reporting discussed above. In this example, some example corresponding time based AVPs may include an Absolute-Granted-Consumption-Time-Request AVP, an Absolute-Used-Consumption-Time-Report AVP, a Percent-Granted-Consumption-Time-Request AVP, and/or a Percent-Used-Consumption-Time-Report AVP.

It will be appreciated that FIG. 1 is for illustrative purposes and that various entities and/or functionality described above in relation to FIG. 1 may be changed, altered, added, or removed. For example, some nodes and/or functions may be combined into a single entity. In another example, some nodes and/or functions may be distributed across multiple nodes and/or platforms. Further, it will appreciated that the AVPs and information therein described above are for illustrative purposes and that other AVPs or information therein may be used for usage monitoring and/or related interval based usage reporting.

Figure 2:
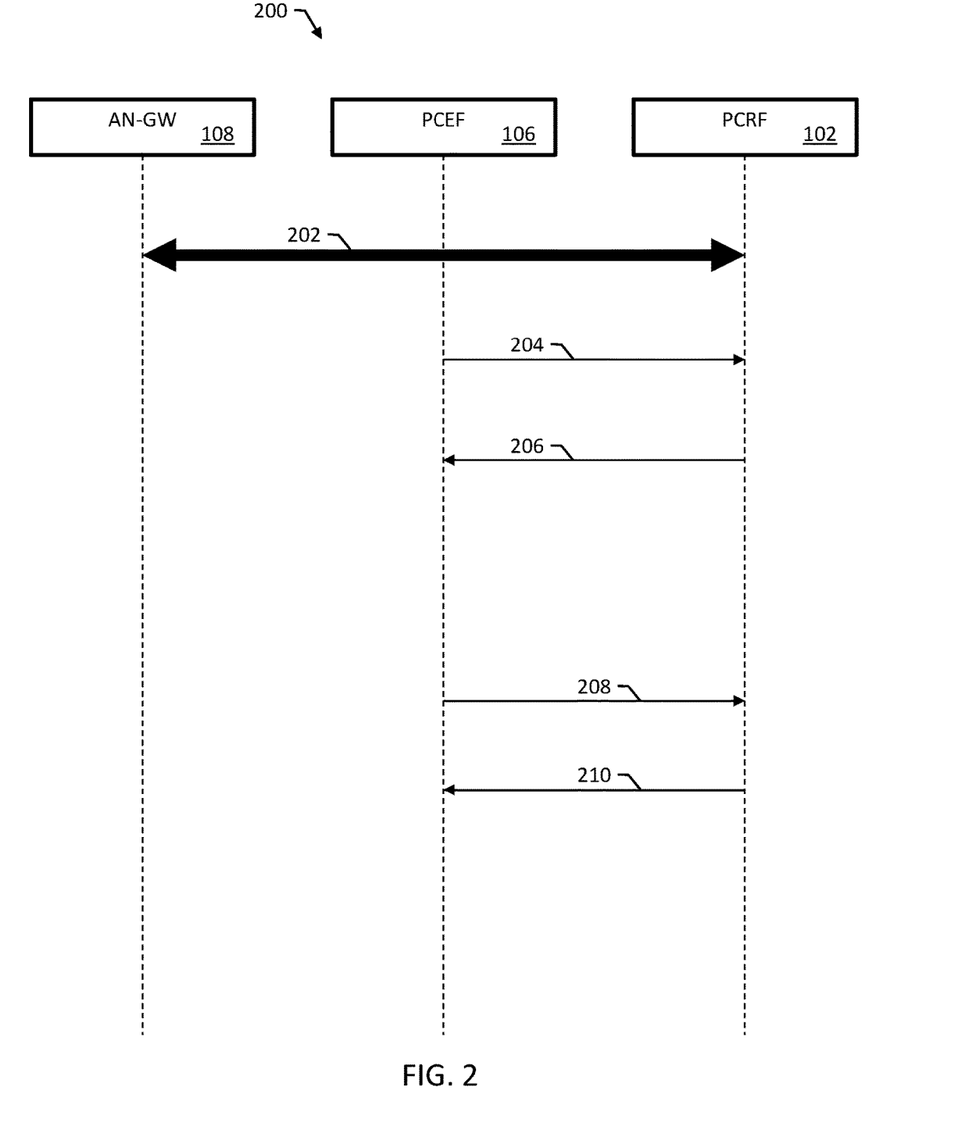
FIG. 2 is a messaging diagram of an example messaging sequence illustrating installation of a usage monitoring and/or reporting rule.

FIG. 2 is a messaging diagram of an example messaging sequence 200 illustrating installation of a usage monitoring rule in the network 100 of FIG. 1 and related reporting associated with the enforcement of the usage monitoring rule.

Messaging sequence 200 begins with an exchange of session establishment messaging 202. Default and dedicated bearers are created for UE 112 as a result of session establishment messaging 202. For example, the default bearer can be created with a create session request message, and the dedicated bearer can be created with a create session request or create bearer request message.

After session establishment messaging 202, PCEF sends a message 204 to PCRF 102 for requesting credit control information. For example, message 204 may be a credit-control-request (CCR) message or another message.

PCRF 102 sends a message 206 with usage monitoring control information. For example, message 206 may a CCA message or another message. In this example, message 206 may include one or more AVPs for requesting interval based usage monitoring at PCEF 106. Continuing with this example, message 206 may include a Granted-Service-Unit AVP that indicates a subscriber or a related session has a usage consumption quota of 10 gigabytes and may also include in an Absolute-Granted-Service-Unit-Request AVP that indicates a usage report or notification message is to be sent for every 2 gigabyte of data consumed.

PCEF 106 may install and enforce a usage monitoring rule based on message 206 or data therein. After a threshold or interval value is met or exceeded, PCEF 106 sends a message 208 to PCRF 102 for reporting the monitored usage. For example, message 208 may be a CCR update message or another message. In this example, message 208 may include an Absolute-Used-Service-Unit AVP indicating that 2 gigabytes of data have been consumed.

PCRF 102 sends a message 210 for triggering one or more actions associated with the reported usage or related usage consumption progress. For example, message 210 may be a CCA update message or an RAR message for triggering a mid-page redirection so as to inform the user of usage consumption progress and/or to inquiry about recharging or re-upping the user's usage consumption quota.

In some examples (not shown in FIG. 2), since usage monitoring may not reset after a first usage report, PCEF 106 may notify PCRF 102 of gradual usage progress, e.g., each time 2 gigabytes of data are consumed. In such examples, PCRF 102 can ignore one or more notifications of usage progress, but may respond or perform one or more actions when needed, e.g., prior to an entire usage consumption quota being used by the subscriber.

It will be appreciated that FIG. 2 is for illustrative purposes and that different and/or additional messages and/or actions may be used for usage monitoring or related functionality. For example, PCRF 102 may send usage monitoring control information or otherwise trigger the installation of a usage monitoring rule at PCEF 106 using a RAR message or another message. It will also be appreciated that various messages and/or actions described herein with regard to FIG. 2 may occur in a different order or sequence.

Figure 3:
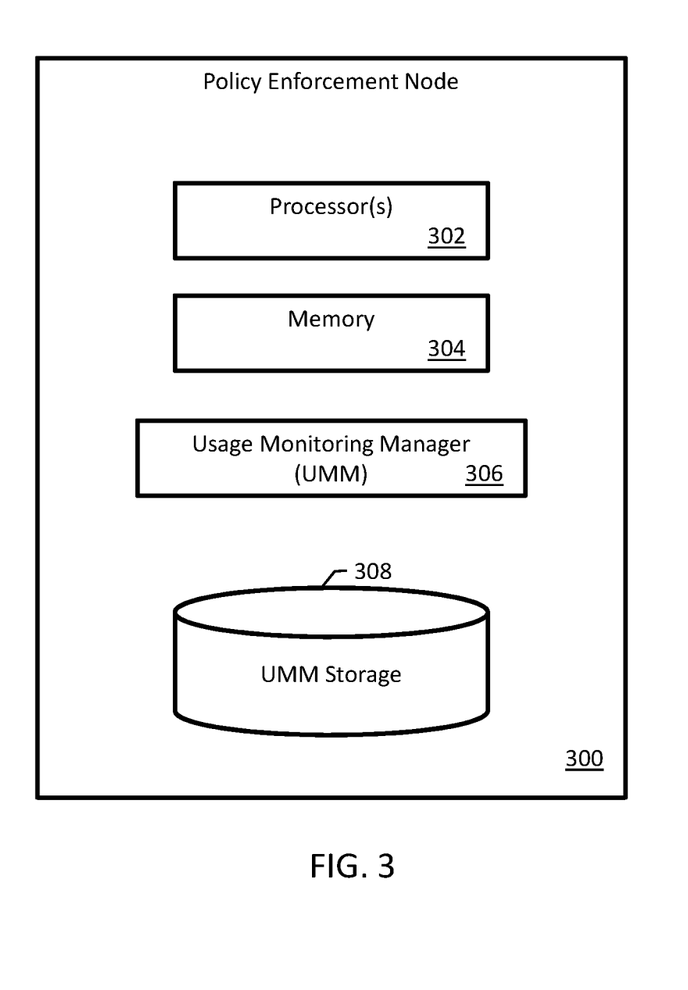
FIG. 3 is a block diagram of an example policy enforcement node configured for usage monitoring.

FIG. 3 is a block diagram of an example policy enforcement node 300 configured for usage monitoring. Policy enforcement node 300 includes one or more processors 302 and memory 304 storing executable instructions for processors 302. Policy enforcement node 300 is configured, by virtue of appropriate programming, to implement a usage monitoring manager (UMM) 306 for installing and enforcing usage monitoring rules and/or for providing notifications and/or reports at intervals or thresholds indicated by PCRF 102.

UMM 306 may represent any suitable entity or entities (e.g., a field-programmable gate array (FPGA), an application-specific integrated circuit (ASIC), and/or software executing on a processor) for performing one or more aspects associated with usage monitoring and/or related notifications. For example, UMM 306 may be configured to receive and process usage monitoring request messages or AVPs therein. In this example, the monitoring request messages or AVPs therein containing usage monitoring control information usable for installing a rule for reporting user equipment (UE) related usage information based on at least one threshold value (e.g., every 2 gigabytes or every 30 minutes) different from a usage consumption quota. Continuing with this example, UMM 306 may be configured to enforce the usage monitoring rule and, in response to UE related usage meeting or exceeding the at least one threshold value, send a usage monitoring report message to a policy rules node, e.g., PCRF 102.

UMM 306 can include or access UMM storage 308. UMM storage 308 may represent any suitable entity or entities (e.g., non-transitory computer readable media, flash memory, random access memory, and/or a storage device) for storing information related to usage monitoring, usage measurements, report templates, and/or monitoring keys (e.g., session and/or subscriber identifiers). For example, UMM storage 308 may store usage monitoring rules for one or more UEs, subscribers, and/or service data flows. In this example, UMM storage 308 may use one or more data structures for associating threshold or interval values and monitoring keys. In some examples, UMM storage 308 may be external to and/or or integrated with policy enforcement node 300 and/or UMM 306.

It will be appreciated that FIG. 3 is for illustrative purposes and that various entities and/or functionality described above in relation to FIG. 3 may be changed, altered, added, or removed. For example, some nodes and/or functions may be combined into a single entity. In another example, some nodes and/or functions may be distributed across multiple nodes and/or platforms.

Figure 4:
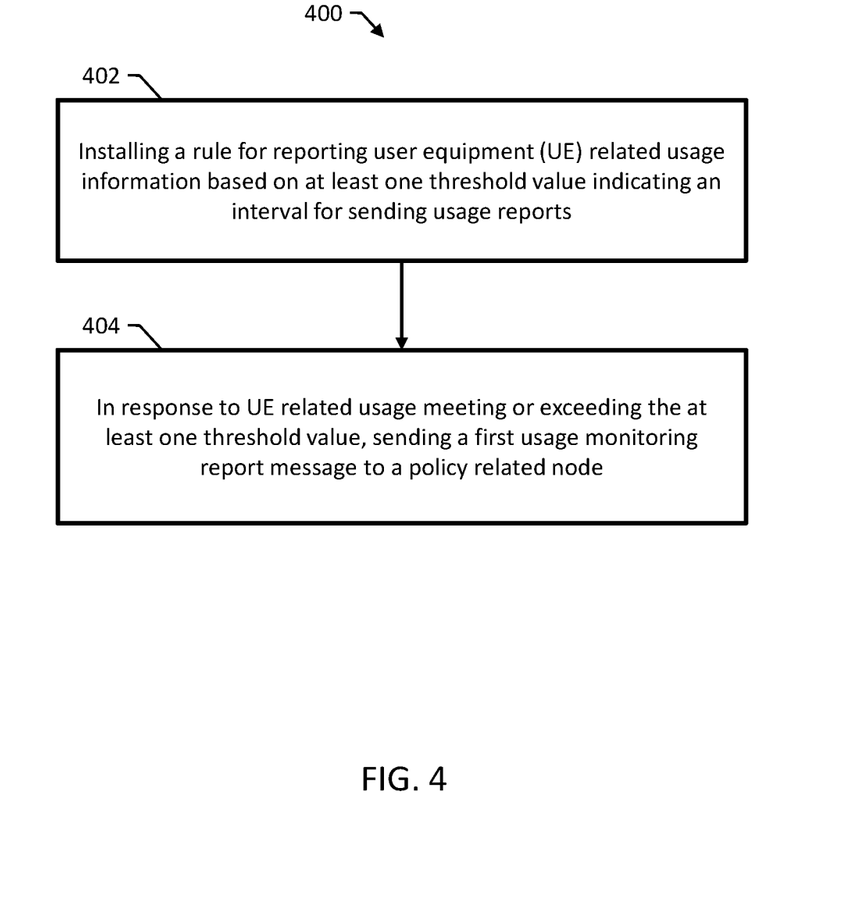
FIG. 4 is a flow diagram of an example method for usage monitoring.

FIG. 4 is a flow diagram of an example method 400 for usage monitoring. Method 400 can be performed by a policy enforcement node or UMM 306 implemented on one or more computer systems, e.g., the PCEF 106 of FIG. 1 and the policy enforcement node 300 of FIG. 3.

Method 400 includes installing a rule for reporting user equipment (UE) related usage information based on at least one threshold value indicating an interval for sending usage reports (402).

Method 400 includes in response to UE related usage meeting or exceeding the at least one threshold value, sending a first usage monitoring report message to a policy rules node (404).

In some examples, prior to installing the rule, a usage monitoring request message may be received by a policy enforcement node (e.g., PCEF 106). In such example, the usage monitoring request message may include usage monitoring control information (e.g., at least one threshold value for indicating an interval for reporting usage).

In some examples, a usage monitoring request message may include one or more AVPs. Example AVPs usable in a usage monitoring rule includes a Usage-Monitoring-Information AVP, an Absolute-Granted-Service-Unit-Request AVP, a Percent-Granted-Service-Unit-Request AVP, an Absolute-Granted-Consumption-Time-Request AVP, or a Percent-Granted-Consumption-Time-Request AVP.

In some examples, a second usage monitoring report message may be sent when an interval associated with a threshold value is met or exceeded again (e.g., a second time).

In some examples, at least one threshold value may include a percentage based data usage value, a data usage value, a percentage based time usage value, or a time usage value.

In some examples, a usage monitoring report message may include one or more AVPs. Example AVPs usable in a usage monitoring rule includes a Usage-Monitoring-Information AVP, an Absolute-Granted-Service-Unit-Report AVP, a Percent-Granted-Service-Unit-Report AVP, an Absolute-Granted-Consumption-Time-Report AVP, or a Percent-Granted-Consumption-Time-Report AVP.

In some examples, a policy rules node may be configured to perform operations comprising: receiving a usage monitoring report message; and notifying the user regarding UE related usage.

In some examples, a mobile network may be an LTE network, a policy enforcement node may be an LTE PCEF, and a policy rules node may be an LTE PCRF.

In some examples, a policy enforcement node (e.g., PCEF 106) may report UE related usage information for one or more UEs, subscribers, or service data flows.

While the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications, and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for usage monitoring, the method comprising:
at a policy enforcement node for enforcing policies in a mobile network:
installing a rule for reporting user equipment (UE) related usage information based on a network usage quota and at least one threshold value that divides the network usage quota into a plurality of portions; and
when network usage by the UE equals or exceeds a first portion of the plurality of portions of the network usage quota, sending a first usage monitoring report message to a policy rules node and when network usage by the UE meets or exceeds a second portion of the plurality of portions of the network usage quota, sending a second usage monitoring report message.

2. The method of claim 1, comprising, prior to installing the rule, receiving a usage monitoring request message including usage monitoring control information or the at least one threshold value.

3. The method of claim 2, wherein the usage monitoring request message includes an attribute value pair (AVP), a Usage-Monitoring-Information AVP, an Absolute-Granted-Service-Unit-Request AVP, a Percent-Granted-Service-Unit-Request AVP, an Absolute-Granted-Consumption-Time-Request AVP, or a Percent-Granted-Consumption-Time-Request AVP.

4. The method of claim 1, wherein the at least one threshold value includes a percentage based data usage value, a data usage value, a percentage based time usage value, or a time usage value.

5. The method of claim 1, wherein the usage monitoring report message includes an attribute value pair (AVP), an Absolute-Granted-Service-Unit-Report AVP, a Percent-Granted-Service-Unit-Report AVP, an Absolute-Granted-Consumption-Time-Report AVP, or a Percent-Granted-Consumption-Time-Report AVP.

6. The method of claim 1, comprising:
at the policy rules node:
receiving the usage monitoring report message; and
notifying the user regarding UE related usage.

7. The method of claim 1, wherein the mobile network is a long term evolution (LTE) network, the policy enforcement node is an LTE policy and charging enforcement function (PCEF), and the policy rules node is an LTE policy and charging rules function (PCRF).

8. The method of claim 1, wherein the policy enforcement node reports the UE related usage information for one or more UEs, subscribers, or service data flows.

9. A system for usage monitoring, the system comprising:
at least one processor; and
a policy enforcement node for enforcing policies in a mobile network, the policy enforcement node implemented using the at least one processor and configured to perform operations comprising:
installing a rule for reporting user equipment (UE) related usage information based on a network usage quota and at least one threshold value that divides the network usage quota into a plurality of portions; and
when network usage by the UE equals or exceeds a first portion of the plurality of portions of the network usage quota, sending a first usage monitoring report message to a policy rules node and when network usage by the UE meets or exceeds a second portion of the plurality of portions of the network usage quota, sending a second usage monitoring report message.

10. The system of claim 9, the operations comprising, prior to installing the rule, receiving a usage monitoring request message including the at least one threshold value.

11. The system of claim 9, wherein the usage monitoring request message includes an attribute value pair (AVP), a Usage-Monitoring-Information AVP, an Absolute-Granted-Service-Unit-Request AVP, a Percent-Granted-Service-Unit-Request AVP, an Absolute-Granted-Consumption-Time-Request AVP, or a Percent-Granted-Consumption-Time-Request AVP.

12. The system of claim 9, wherein the at least one threshold value includes a percentage based data usage value, a data usage value, a percentage based time usage value, or a time usage value.

13. The system of claim 12, wherein the usage monitoring report message includes an attribute value pair (AVP), a Usage-Monitoring-Information AVP, an Absolute-Granted-Service-Unit-Report AVP, a Percent-Granted-Service-Unit-Report AVP, an Absolute-Granted-Consumption-Time-Report AVP, or a Percent-Granted-Consumption-Time-Report AVP.

14. The system of claim 9, wherein the policy rules node is configured to perform operations comprising:
receiving the usage monitoring report message; and
notifying the user regarding UE related usage.

15. The system of claim 9, wherein the mobile network is a long term evolution (LTE) network, the policy enforcement node is an LTE policy and charging enforcement function (PCEF), and the policy rules node is an LTE policy and charging rules function (PCRF).

16. The system of claim 9, wherein the policy enforcement node reports the UE related usage information for one or more UEs, subscribers, or service data flows.

17. A non-transitory computer readable medium having stored thereon executable instructions that when executed by one or more processors control the one or more processors to perform operations comprising:
- at a policy enforcement node for enforcing policies in a mobile network:
  - installing a rule for reporting user equipment (UE) related usage information based on a network usage quota and at least one threshold value that divides the network usage quota into a plurality of portions; and
  - when network usage by the UE equals or exceeds a first portion of the plurality of portions of the network usage quota, sending a first usage monitoring report message to a policy rules node and when network usage by the UE meets or exceeds a second portion of the plurality of portions of the network usage quota, sending a second usage monitoring report message.

18. The non-transitory computer readable medium of claim 17, the operations comprising, prior to installing the rule, receiving a usage monitoring request message including the at least one threshold value.

* * * * *

UNITED STATES PATENT AND TRADEMARK OFFICE
CERTIFICATE OF CORRECTION

PATENT NO. : 10,116,457 B1
APPLICATION NO. : 15/648398
DATED : October 30, 2018
INVENTOR(S) : Juneja Page 1 of 1

It is certified that error appears in the above-identified patent and that said Letters Patent is hereby corrected as shown below:

On the Title Page

Column 2, under Primary Examiner, Line 1, delete "Chong" and insert -- Chuong --, therefor.

In the Specification

In Column 7, Line 18, delete "and or" and insert -- and/or --, therefor.

In Column 7, Line 59, delete "and or" and insert -- and/or --, therefor.

Signed and Sealed this
Seventeenth Day of December, 2019

Andrei Iancu
*Director of the United States Patent and Trademark Office*